US010233760B2

(12) United States Patent
Lee

(10) Patent No.: US 10,233,760 B2
(45) Date of Patent: Mar. 19, 2019

(54) CMAS-RESISTANT THERMAL BARRIER COATINGS

(71) Applicant: Rolls-Royce Corporation, Indianapolis, IN (US)

(72) Inventor: Kang N. Lee, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 177 days.

(21) Appl. No.: 14/033,043

(22) Filed: Sep. 20, 2013

(65) Prior Publication Data

US 2014/0065438 A1  Mar. 6, 2014

Related U.S. Application Data

(63) Continuation of application No. 12/016,649, filed on Jan. 18, 2008, now abandoned.

(51) Int. Cl.
*C04B 41/52* (2006.01)
*F01D 5/28* (2006.01)
(Continued)

(52) U.S. Cl.
CPC ............ *F01D 5/288* (2013.01); *C04B 41/009* (2013.01); *C04B 41/52* (2013.01); *C04B 41/89* (2013.01); *C09D 1/00* (2013.01); *C23C 28/042* (2013.01); *C23C 28/048* (2013.01); *C23C 28/321* (2013.01); *C23C 28/3215* (2013.01); *C23C 28/345* (2013.01); *C23C 28/3455* (2013.01); *C23C 28/36* (2013.01); *C23C 30/00* (2013.01); *Y10T 428/1266* (2015.01);
(Continued)

(58) Field of Classification Search
CPC ....... C04B 41/009; C04B 41/52; C04B 41/89; C09D 1/00; C23C 28/042; C23C 28/321; C23C 28/3215; C23C 28/345; C23C 28/3455; C23C 28/36; C23C 30/00; C23C 28/048; F01D 5/288; Y10T 428/12549; Y10T 428/1266; Y10T 428/12667; Y10T 428/12875; Y10T 428/12931; Y10T 428/26; Y10T 428/31678
See application file for complete search history.

(56) References Cited

U.S. PATENT DOCUMENTS 3,962,059 A   6/1976   Kaup et al.
3,964,877 A   6/1976   Bessen et al.
(Continued)

FOREIGN PATENT DOCUMENTS

CA   2712248       9/2012
EP   0972853 A1   1/2000
(Continued)

OTHER PUBLICATIONS

Anderson, et al., "Ultrasonic Measurement of the Kearns Texture Factors in Zircaloy, Zirconium, and Titanium," vol. 30A, Aug. 1999, Metallurgical and Materials Transactions, 8 pp.
(Continued)

*Primary Examiner* — Jonathan C Langman
(74) *Attorney, Agent, or Firm* — Shumaker & Sieffert, P.A.

(57) ABSTRACT

A coating including a CMAS-resistant layer with a rare earth oxide. The CMAS-resistant layer is essentially free of zirconia and hafnia, and may further include at least one of alumina, silica, and combinations thereof.

19 Claims, 10 Drawing Sheets

(51) Int. Cl.
- *C04B 41/00* (2006.01)
- *C04B 41/89* (2006.01)
- *C09D 1/00* (2006.01)
- *C23C 30/00* (2006.01)
- *C23C 28/04* (2006.01)
- *C23C 28/00* (2006.01)

(52) U.S. Cl.
CPC ............... *Y10T 428/12549* (2015.01); *Y10T 428/12667* (2015.01); *Y10T 428/12875* (2015.01); *Y10T 428/12931* (2015.01); *Y10T 428/26* (2015.01); *Y10T 428/31678* (2015.04)

(56) References Cited

U.S. PATENT DOCUMENTS

| | | |
|---|---|---|
| 4,094,673 A | 6/1978 | Erickson et al. |
| 4,386,968 A | 6/1983 | Hinkel et al. |
| 4,588,607 A | 5/1986 | Matarese et al. |
| 4,663,250 A | 5/1987 | Ong et al. |
| 4,914,794 A | 4/1990 | Strangman |
| 4,996,117 A | 2/1991 | Chu et al. |
| 5,320,909 A | 6/1994 | Scharman et al. |
| 5,350,599 A | 9/1994 | Rigney et al. |
| 5,391,404 A | 2/1995 | Lee et al. |
| 5,496,644 A | 3/1996 | Lee et al. |
| 5,660,885 A | 8/1997 | Hasz et al. |
| 5,704,759 A | 1/1998 | Draskovich et al. |
| 5,714,202 A | 2/1998 | Lemelson et al. |
| 5,773,141 A | 6/1998 | Hasz et al. |
| 5,851,678 A | 12/1998 | Hasz et al. |
| 5,869,146 A | 2/1999 | McCluskey et al. |
| 5,871,820 A | 2/1999 | Hasz et al. |
| 5,876,850 A | 3/1999 | Skowronski et al. |
| 5,876,860 A | 3/1999 | Marijnissen et al. |
| 5,914,189 A | 6/1999 | Hasz et al. |
| 5,985,470 A | 11/1999 | Spitsberg et al. |
| 6,057,047 A | 5/2000 | Maloney |
| 6,261,643 B1 | 7/2001 | Hasz et al. |
| 6,284,325 B1 | 9/2001 | Eaton, Jr. et al. |
| 6,296,942 B1 | 10/2001 | Eaton et al. |
| 6,299,988 B1 | 10/2001 | Wang et al. |
| 6,312,763 B1 | 11/2001 | Eaton, Jr. et al. |
| 6,410,148 B1 | 6/2002 | Eaton, Jr. et al. |
| 6,465,090 B1 | 10/2002 | Stowell et al. |
| 6,468,648 B1 | 10/2002 | McCluskey et al. |
| 6,485,848 B1 | 11/2002 | Wang et al. |
| 6,562,409 B2 | 5/2003 | Koshkarian et al. |
| 6,587,534 B2 | 7/2003 | Hassoun et al. |
| 6,613,445 B2 | 9/2003 | Sangeeta et al. |
| 6,617,036 B2 | 9/2003 | Eaton et al. |
| 6,617,037 B2 | 9/2003 | Sun et al. |
| 6,627,323 B2 | 9/2003 | Nagaraj et al. |
| 6,645,649 B2 | 11/2003 | Tanaka et al. |
| 6,720,038 B2 | 4/2004 | Darolia et al. |
| 6,723,674 B2 | 4/2004 | Wang et al. |
| 6,733,908 B1 | 5/2004 | Lee et al. |
| 6,759,151 B1 | 7/2004 | Lee |
| 6,787,195 B2 | 9/2004 | Wang et al. |
| 6,812,176 B1 | 11/2004 | Zhu et al. |
| 6,835,465 B2 | 12/2004 | Allen et al. |
| 6,849,334 B2 | 2/2005 | Horne et al. |
| 6,869,508 B2 | 3/2005 | Darolia et al. |
| 6,887,528 B2 | 5/2005 | Lau et al. |
| 6,887,595 B1 | 5/2005 | Darolia et al. |
| 6,890,668 B2 | 5/2005 | Bruce et al. |
| 6,893,750 B2 | 5/2005 | Nagaraj et al. |
| 6,902,662 B2 | 6/2005 | Eaton et al. |
| 6,902,836 B2 | 6/2005 | Eaton et al. |
| 6,903,162 B2 | 6/2005 | Nygard et al. |
| 6,933,061 B2 | 8/2005 | Nagaraj et al. |
| 6,933,066 B2 | 8/2005 | Nagaraj et al. |
| 6,960,395 B2 | 11/2005 | Spitsberg et al. |
| 6,969,555 B2 | 11/2005 | Meschter et al. |
| 7,008,674 B2 | 3/2006 | Nagaraj et al. |
| 7,063,894 B2 | 6/2006 | Sun et al. |
| 7,090,894 B2 | 8/2006 | Carper et al. |
| 7,186,466 B2 | 3/2007 | Zhu et al. |
| 7,226,668 B2 | 6/2007 | Nagaraj et al. |
| 7,247,393 B2 | 7/2007 | Hazel et al. |
| 7,291,408 B2 | 11/2007 | Litton et al. |
| 7,306,860 B2 | 12/2007 | Strangman et al. |
| 7,354,651 B2 | 4/2008 | Hazel et al. |
| 7,357,994 B2 | 4/2008 | Hazel et al. |
| 7,364,802 B2 | 4/2008 | Spitsberg et al. |
| 7,374,818 B2 | 5/2008 | Bhatia et al. |
| 7,374,825 B2 | 5/2008 | Hazel et al. |
| 7,422,671 B2 | 9/2008 | Bhatia et al. |
| 7,442,444 B2 | 10/2008 | Hazel et al. |
| 7,449,254 B2 | 11/2008 | Spitsberg et al. |
| 7,510,777 B2 | 3/2009 | Darolia et al. |
| 7,510,785 B2 | 3/2009 | Fukudome et al. |
| 7,544,394 B2 | 6/2009 | Boutwell et al. |
| 7,579,085 B2 | 8/2009 | Hazel |
| 7,595,114 B2 | 9/2009 | Meschter et al. |
| 7,666,512 B2 | 2/2010 | Bhatia et al. |
| 7,695,830 B2 | 4/2010 | Strangman et al. |
| 7,740,960 B1 | 6/2010 | Zhu et al. |
| 7,780,832 B2 | 8/2010 | Hasz |
| 7,824,744 B2 | 11/2010 | Darolia et al. |
| 7,858,212 B2 | 12/2010 | Schlichting et al. |
| 7,862,901 B2 | 1/2011 | Darolia et al. |
| 7,867,575 B2 | 1/2011 | Boutwell et al. |
| 7,879,411 B2 | 2/2011 | Hass et al. |
| 7,927,722 B2 | 4/2011 | Schlichting et al. |
| 7,951,459 B2 | 5/2011 | Tang et al. |
| 7,968,217 B2 | 6/2011 | Sarrafi-Nour et al. |
| 7,981,530 B2 | 7/2011 | Sporer et al. |
| 7,994,022 B2 | 8/2011 | Kakehata |
| 8,017,062 B2 | 9/2011 | Narendar et al. |
| 8,034,153 B2 | 10/2011 | Marchiando et al. |
| 8,039,113 B2 | 10/2011 | Kirby et al. |
| 8,062,759 B2 | 11/2011 | Fu et al. |
| 8,084,086 B2 | 12/2011 | Hass et al. |
| 8,119,247 B2 | 2/2012 | Kirby et al. |
| 8,124,252 B2 | 2/2012 | Cybulsky et al. |
| 8,216,689 B2 | 7/2012 | Witz et al. |
| 8,273,231 B2 | 9/2012 | Creech |
| 8,470,460 B2 | 6/2013 | Lee |
| 8,501,840 B2 | 8/2013 | Kirby et al. |
| 8,586,169 B2 | 11/2013 | Namba et al. |
| 8,658,255 B2 | 2/2014 | Kirby et al. |
| 8,722,270 B2 | 5/2014 | Pastula et al. |
| 8,940,417 B2 | 1/2015 | Courcot et al. |
| 8,999,457 B2 | 4/2015 | Kirby et al. |
| 9,005,716 B2 | 4/2015 | Kirby et al. |
| 9,005,717 B2 | 4/2015 | Kirby et al. |
| 9,023,435 B2 | 5/2015 | Kirby et al. |
| 9,056,802 B2 | 6/2015 | Kirby et al. |
| 9,062,564 B2 | 6/2015 | Kirby et al. |
| 9,133,541 B2 | 9/2015 | Kirby et al. |
| 9,194,242 B2 | 11/2015 | Lee |
| 9,212,100 B2 | 12/2015 | Kirby et al. |
| 2001/0033630 A1 | 10/2001 | Hassoun et al. |
| 2002/0098391 A1 | 7/2002 | Tanaka et al. |
| 2003/0113553 A1 | 6/2003 | Sun et al. |
| 2003/0113559 A1 | 6/2003 | Eaton et al. |
| 2003/0118841 A1 | 6/2003 | Horne et al. |
| 2003/0138658 A1 | 7/2003 | Taylor et al. |
| 2004/0038085 A1 | 2/2004 | Litton et al. |
| 2004/0043244 A1 | 3/2004 | Bruce et al. |
| 2004/0115351 A1 | 6/2004 | Lau et al. |
| 2004/0151840 A1 | 8/2004 | Wang et al. |
| 2004/0170849 A1 | 9/2004 | Ackerman et al. |
| 2005/0003172 A1 | 1/2005 | Wheeler et al. |
| 2005/0003175 A1 | 1/2005 | Wheeler et al. |
| 2005/0126494 A1 | 6/2005 | Darolia et al. |
| 2005/0129511 A1 | 6/2005 | Allen |
| 2005/0129973 A1 | 6/2005 | Eaton et al. |
| 2005/0142392 A1 | 6/2005 | Spitsberg et al. |
| 2005/0164027 A1 | 7/2005 | Lau et al. |
| 2005/0255648 A1 | 11/2005 | Bhatia et al. |
| 2006/0014029 A1 | 1/2006 | Saak et al. |
| 2006/0024513 A1 | 2/2006 | Schlichting et al. |

(56) References Cited

U.S. PATENT DOCUMENTS

| | | |
|---|---|---|
| 2006/0024527 A1 | 2/2006 | Schlichting et al. |
| 2006/0024528 A1 | 2/2006 | Strangman et al. |
| 2006/0029733 A1 | 2/2006 | Bhatia et al. |
| 2006/0046450 A1 | 3/2006 | Narendar et al. |
| 2006/0073361 A1 | 4/2006 | Fukudome et al. |
| 2006/0078750 A1 | 4/2006 | Zhu et al. |
| 2006/0115659 A1* | 6/2006 | Hazel et al. ............ 428/450 |
| 2006/0115661 A1 | 6/2006 | Hazel et al. |
| 2006/0154093 A1 | 7/2006 | Meschter et al. |
| 2006/0166018 A1 | 7/2006 | Spitsberg et al. |
| 2006/0210800 A1 | 9/2006 | Spitsberg et al. |
| 2006/0211241 A1 | 9/2006 | Govern et al. |
| 2006/0280952 A1 | 12/2006 | Hazel et al. |
| 2006/0280953 A1 | 12/2006 | Hazel et al. |
| 2006/0280954 A1 | 12/2006 | Spitsberg et al. |
| 2006/0280955 A1 | 12/2006 | Spitsberg et al. |
| 2006/0280963 A1 | 12/2006 | Hazel et al. |
| 2007/0014996 A1 | 1/2007 | Bhatia et al. |
| 2007/0071996 A1* | 3/2007 | Hazel et al. ............ 428/650 |
| 2007/0082131 A1 | 4/2007 | Doesberg et al. |
| 2007/0119713 A1 | 5/2007 | Hasz |
| 2007/0141367 A1 | 6/2007 | Darolia et al. |
| 2007/0160859 A1 | 7/2007 | Darolia et al. |
| 2007/0184204 A1 | 8/2007 | Balagopal et al. |
| 2007/0207330 A1 | 9/2007 | Tulyani et al. |
| 2007/0224411 A1 | 9/2007 | Hazel et al. |
| 2007/0227299 A1 | 10/2007 | Marchiando et al. |
| 2008/0124479 A1 | 5/2008 | Hazel et al. |
| 2008/0145674 A1 | 6/2008 | Darolia et al. |
| 2008/0206542 A1 | 8/2008 | Vance et al. |
| 2008/0274336 A1 | 11/2008 | Merrill et al. |
| 2009/0004427 A1 | 1/2009 | Sarrafi-Nour et al. |
| 2009/0102008 A1 | 4/2009 | Kakehata |
| 2009/0110953 A1 | 4/2009 | Margolies |
| 2009/0155554 A1* | 6/2009 | Gentleman et al. ............ 428/210 |
| 2009/0162539 A1 | 6/2009 | Boutwell et al. |
| 2009/0162556 A1 | 6/2009 | Boutwell et al. |
| 2009/0162684 A1 | 6/2009 | Creech |
| 2009/0169914 A1 | 7/2009 | Fu et al. |
| 2009/0176059 A1 | 7/2009 | Namba et al. |
| 2009/0178413 A1 | 7/2009 | Lee |
| 2009/0184280 A1 | 7/2009 | Lee |
| 2009/0186237 A1 | 7/2009 | Lee |
| 2009/0297866 A1 | 12/2009 | Raybould et al. |
| 2009/0324930 A1 | 12/2009 | Tulyani et al. |
| 2010/0080984 A1 | 4/2010 | Lee |
| 2010/0129636 A1 | 5/2010 | Cybulsky et al. |
| 2010/0136349 A1 | 6/2010 | Lee |
| 2010/0159150 A1 | 6/2010 | Kirby et al. |
| 2010/0159253 A1 | 6/2010 | Kirby et al. |
| 2011/0027467 A1 | 2/2011 | Kirby et al. |
| 2011/0027469 A1 | 2/2011 | Kirby et al. |
| 2011/0027470 A1 | 2/2011 | Kirby et al. |
| 2011/0027476 A1 | 2/2011 | Kirby et al. |
| 2011/0027484 A1 | 2/2011 | Kirby et al. |
| 2011/0027517 A1 | 2/2011 | Kirby et al. |
| 2011/0027557 A1 | 2/2011 | Kirby et al. |
| 2011/0027558 A1 | 2/2011 | Kirby et al. |
| 2011/0027559 A1 | 2/2011 | Kirby et al. |
| 2011/0027578 A1 | 2/2011 | Kirby et al. |
| 2011/0033630 A1 | 2/2011 | Naik et al. |
| 2011/0111310 A1 | 5/2011 | Pastula et al. |
| 2011/0256411 A1 | 10/2011 | Courcot et al. |
| 2012/0076943 A1 | 3/2012 | Kirby et al. |
| 2012/0077004 A1 | 3/2012 | Kirby et al. |
| 2012/0128879 A1 | 5/2012 | Cybulsky et al. |
| 2012/0244383 A1 | 9/2012 | Meschter et al. |
| 2013/0011578 A1 | 1/2013 | Hass et al. |
| 2013/0136915 A1 | 5/2013 | Naik |
| 2013/0189531 A1 | 7/2013 | Lee |
| 2013/0224457 A1 | 8/2013 | Lee |
| 2014/0065438 A1 | 3/2014 | Lee |
| 2014/0072816 A1 | 3/2014 | Lee |
| 2014/0199163 A1 | 7/2014 | Lee |
| 2015/0267058 A1 | 9/2015 | Lee |
| 2017/0044930 A1 | 2/2017 | Luthra et al. |

FOREIGN PATENT DOCUMENTS

| | | |
|---|---|---|
| EP | 1335040 A2 | 8/2003 |
| EP | 1400611 A1 | 3/2004 |
| EP | 1428902 A1 | 6/2004 |
| EP | 1479661 A2 | 11/2004 |
| EP | 1626039 A2 | 2/2006 |
| EP | 1666638 A1 | 6/2006 |
| EP | 1795515 A2 | 6/2007 |
| EP | 1806435 A2 | 7/2007 |
| EP | 1806435 A3 | 8/2007 |
| EP | 1829847 A2 | 9/2007 |
| EP | 1975258 A1 | 10/2008 |
| EP | 2108715 A2 | 10/2009 |
| EP | 2189504 A1 | 5/2010 |
| EP | 2192098 A2 | 6/2010 |
| EP | 2194164 A1 | 6/2010 |
| EP | 2208805 A1 | 7/2010 |
| EP | 2245096 A2 | 11/2010 |
| EP | 2287131 A2 | 2/2011 |
| EP | 2287134 A2 | 2/2011 |
| EP | 2287138 A2 | 2/2011 |
| EP | 2468918 A2 | 6/2012 |
| GB | 2319248 A | 5/1998 |
| SG | 163216 | 3/2013 |
| WF | WO2007/116547 | 10/2007 |
| WO | WO2012/012431 A1 | 7/2001 |
| WO | WO2006/023894 A2 | 3/2006 |
| WO | WO2007/098152 A1 | 8/2007 |
| WO | WO2008/103163 A2 | 8/2008 |
| WO | WO2008/109214 A2 | 9/2008 |
| WO | WO2009/091721 A2 | 7/2009 |
| WO | WO2009/091724 A1 | 7/2009 |
| WO | WO2010/039699 A3 | 4/2010 |
| WO | 2011085109 A1 | 7/2011 |
| WO | 2011085376 A1 | 7/2011 |
| WO | WO2011/123432 A1 | 10/2011 |
| WO | 2012027442 A1 | 3/2012 |
| WO | 2012122373 A1 | 9/2012 |
| WO | WO2012/129431 A1 | 9/2012 |

OTHER PUBLICATIONS

Lee, et al., "Rare earth silicate environmental barrier coatings for Si/C/SiC composites and Si3N4 ceramics," Journal of the European Ceramic Society 25, 2005, pp. 1705-1715.

Shelby, et al., "Rare earth Aluminosilicate glasses," Journal of American Ceramic Society, vol. 73, No. 1, 1990, pp. 39-42.

International Preliminary Report on Patentability from corresponding international application No. PCT/US2009/030826, dated Jul. 29, 2010, 7 pp.

Notification of Transmittal of the International Search Report and PCT Written Opinion, or the Declaration from corresponding international patent application No. PCT/US2009/030826, dated Jul. 27, 2009, 16 pp.

U.S. Appl. No. 14/006,848, by Kang N. Lee, filed Mar. 22, 2012.

Prosecution History from U.S. Appl. No. 12/016,649, dated Aug. 8, 2008 through Jun. 20, 2013, 128 pp.

Prosecution History from U.S. Appl. No. 13/811,361, dated Jan. 21, 2013 through May 7, 2013, 16 pp.

Prosecution History from U.S. Appl. No. 13/638,277, dated Sep. 28, 2012 through Sep. 28, 2012 8 pp.

Prosecution History from U.S. Pat. No. 8,470,460, dated Oct. 31, 2012 through May 28, 2013, 25 pp.

Invitation to Pay Additional Fees and, Where Applicable, Protest Fee and Annex to the Invitation to Pay Additional Fees and Communication Relating to the Results of the Partial International Search for counterpart application No. PCT/US2009/030826 dated Jun. 8, 2009, 5 pp.

Office Action from corresponding Canadian application No. 2,712,248, dated Jun. 10, 2011, 3 pp.

(56) References Cited

OTHER PUBLICATIONS

Examination Report from corresponding Singapore application No. 201005160-5, dated Jun. 19, 2012, 6 pp.
Notification Concerning Transmittal of International Preliminary Report on Patentability (Chapter I of the Patent Cooperation Treaty) from corresponding PCT Application No. PCT/US2009/030826, dated Jul. 29, 2010, (8 pages).
Office Action from the Intellectual Property Office of Singapore (IPOS) with Invitation to Respond to the Search Report and Written Opinion for corresponding Singapore application No. 201005160-5, dated Nov. 15, 2011, 6 pp.
Directed Vapor Technologies International, Inc., "Coating Technology for the Future", downloaded on Dec. 9, 2013 at http://www.directedvapor.com/Capabilities_Brochure.pdf, 7 pp.
Kramer et al., "Thermochemical Interaction of Thermal Barrier Coatings with Molten CaO—MgO—Al2O3—SiO2 (CMAS) Deposits," Journal of the American Ceramic Society, vol. 89, No. 10, Aug. 9, 2006, 9 pp.
Harder et al., "Chemical and Mechanical Consequences of Environmental Barrier Coating Exposure to Calcium-Magnesium-Aluminosilicate," Journal of the American Ceramic Society, vol. 94, No. S1, Mar. 17, 2011, 8 pp.
Grant, et al., "CMAS degradation of environmental barrier coatings," Surface and Coatings Technology, vol. 202, Jul. 4, 2007, 5 pp.
Office Action from U.S. Appl. No. 13/638,277, dated Oct. 9, 2014, 15 pp.
Office Action from U.S. Appl. No. 13/811,361, dated Oct. 16, 2014, 12 pp.
Amendment in Response to Office Action dated Oct. 16, 2014, from U.S. Appl. No. 13/811,361, filed Feb. 16, 2015, 16 pp.
Amendment in Response to Office Action dated Oct. 9, 2014, from U.S. Appl. No. 13/638,277, filed Feb. 5, 2015, 14 pp.
Final Office Action from U.S. Appl. No. 13/638,277, dated Jun. 1, 2015, 16 pp.
Final Office Action from U.S. Appl. No. 13/811,361, dated Apr. 13, 2015, 19 pp.
Response to Final Office Action dated Jun. 1, 2015, from U.S. Appl. No. 13/638,277, filed Jul. 29, 2015, 13 pp.
Response to Final Office Action dated Apr. 13, 2015, from U.S. Appl. No. 13/811,361, filed Jun. 30, 2015, 12 pp.
Response to Final Office Action dated Apr. 13, 2015 and Advisory Action dated Jul. 16, 2015, from U.S. Appl. No. 13/811,361, filed Aug. 13, 2015, 9 pp.
Notice of Allowance from U.S. Appl. No. 13/811,361, dated Sep. 2, 2015, 5 pp.
Intent to Grant dated Dec. 21, 2017, from counterpart European Application No. 09702198.4, 6 pp.
Final Office Action from U.S. Appl. No. 13/638,277, dated Dec. 6, 2017, 19 pp.
Examination Report from counterpart European Application No. 09702198.4, dated Dec. 7, 2016, 5 pp.
Response to Examination Report dated Dec. 7, 2017, from counterpart European Application No. 09702198.4, filed Mar. 21, 2017, 5 pp.
Amendment in Response to Office Action dated May 25, 2017, from U.S. Appl. No. 13/638,277, filed Aug. 24, 2017, 17 pp.
Ndamka, "Microstructural Damage of Thermal Barrier Coating Due to CMAS Attack," Cranfield University, School of Applied Sciences Surface Engineering and Nanotechnology Institute (SENTI), Oct. 2013, pp. 332.

\* cited by examiner

CMAS-RESISTANT THERMAL BARRIER COATINGS

This application is a continuation of U.S. application Ser. No. 12/016,649, filed on Jan. 18, 2008, entitled, "CMAS-RESISTANT THERMAL BARRIER COATINGS," which is incorporated herein by reference in its entirety.

TECHNICAL FIELD

The present disclosure generally relates to thermal barrier coatings for high-temperature mechanical systems, such as gas turbine engines, and more particularly to thermal barrier coatings including rare earth oxides.

BACKGROUND

The components of high-temperature mechanical systems, such as, for example, gas-turbine engines, must operate in severe environments. For example, the high-pressure turbine blades and vanes exposed to hot gases in commercial aeronautical engines typically experience metal surface temperatures of about 1000° C., with short-term peaks as high as 1100° C. Typical components of high-temperature mechanical systems include a Ni or Co-based superalloy substrate. In an attempt to reduce the temperatures experienced by the substrate, the substrate can be coated with a thermal barrier coating (TBC). The thermal barrier coating may include a thermally insulative ceramic topcoat and is bonded to the substrate by an underlying metallic bond coat. The TBC, usually applied either by air plasma spraying or electron beam physical vapor deposition, is most often a layer of yttria-stabilized zirconia (YSZ) with a thickness of about 100-500 μm. The properties of YSZ include low thermal conductivity, high oxygen permeability, and a relatively high coefficient of thermal expansion. The YSZ TBC is also typically made "strain tolerant" and the thermal conductivity further lowered by depositing a structure that contains numerous pores and/or pathways.

Economic and environmental concerns, i.e., the desire for improved efficiency and reduced emissions, continue to drive the development of advanced gas turbine engines with higher inlet temperatures. As the turbine inlet temperature continues to increase, there is a demand for a TBC with lower thermal conductivity and higher temperature stability to minimize the increase in, maintain, or even lower the temperatures experienced by substrate.

SUMMARY

In general, the invention is directed to a TBC or EBC topcoat having enhanced CMAS-resistance compared to conventional YSZ topcoats. CMAS is a calcia-magnesia-alumina-silicate deposit resulting from the ingestion of siliceous minerals (dust, sand, volcanic ashes, runway debris, and the like) with the intake of air in gas turbine engines.

In one aspect, the disclosure is directed to a coating with a CMAS-resistant layer including a rare earth oxide, wherein the CMAS-resistant layer is essentially free of zirconia and hafnia.

In another aspect the disclosure is directed to a coating with a CMAS-resistant layer including a rare earth oxide and a second layer. The second layer includes a compound selected from a MCrAlY alloy, wherein M is selected from Ni, Co, and NiCo; a β-NiAl alloy; a γ-Ni+γ'-Ni$_3$Al alloy; rare earth oxide-stabilized zirconia, rare earth oxide-stabilized hafnia, mullite, silicon, barium strontium aluminosilicate, calcium aluminosilicate, cordierite, lithium aluminosilicate, rare earth silicates, and combinations thereof. The CMAS-resistant layer is adjacent the second layer.

In yet another aspect, the disclosure is directed to an article with a substrate and a CMAS-resistant layer including a rare earth oxide, wherein the first layer is essentially free of zirconia and hafnia.

The details of one or more embodiments of the invention are set forth in the accompanying drawings and the description below. Other features, objects, and advantages of the invention will be apparent from the description and drawings, and from the claims.

DETAILED DESCRIPTION

In general, the disclosure is directed to thermal barrier coating (TBC) compositions that possess increased CMAS (calcia-magnesia-alumina-silicate) degradation resistance compared to conventional yttria-stabilized zirconia (YSZ) TBCs, and articles coated with such TBCs. More specifically, the disclosure is directed to a thermal barrier coating including a CMAS-resistant layer that reacts with CMAS leading to increased CMAS degradation resistance compared to conventional YSZ TBCs.

As turbine inlet temperatures continue to increase, new thermal barrier coatings are required with better high temperature performance. As described briefly above, TBCs are typically deposited as a porous structure, which increases the stress tolerance and reduces the thermal conductivity of the TBC. However, this porous structure is susceptible to damage. Higher turbine inlet temperatures may lead to damage of the TBC when CMAS, a calcia-magnesia-alumina-silicate deposit, is formed from the ingestion of siliceous minerals (dust, sand, volcanic ashes, runway debris, and the like) with the intake of air in gas turbine engines. Typical CMAS deposits have a melting temperature of about 1200° C. to about 1250° C. (about 2200° F. to about 2300° F.). As advanced engines run at TBC surface temperatures above the CMAS melting temperature, the molten CMAS may infiltrate the pores of the TBC. When the component is cooled below the CMAS melting temperature, the CMAS solidifies, which exerts a strain on the TBC and may reduce its useful life. The filling of the pores of the TBC with molten CMAS may also increase the thermal conductivity of the TBC, which is detrimental to the TBC performance and causes higher thermal stress on the component substrate.

Additionally, the molten CMAS may dissolve the YSZ TBC. The YSZ TBC dissolves preferentially along grain boundaries, and depending on the melt chemistry, zirconia with lower yttria content may precipitate out of the molten solution, thus decreasing the effectiveness of the TBC.

Figure 1A:
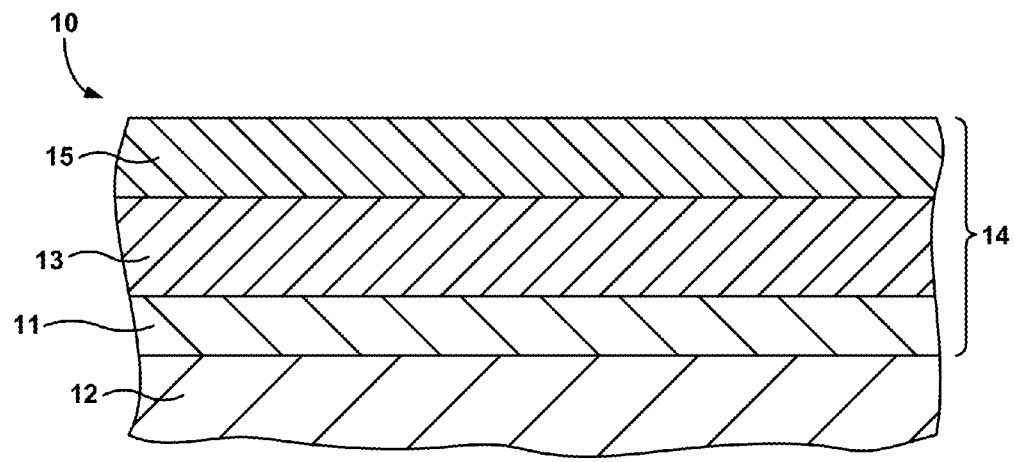
FIGS. 1A and 1B are cross-sectional diagrams of a substrate coated with a bond coat and a thermal or environmental barrier coating including a CMAS-resistant layer.
Figure 1B:
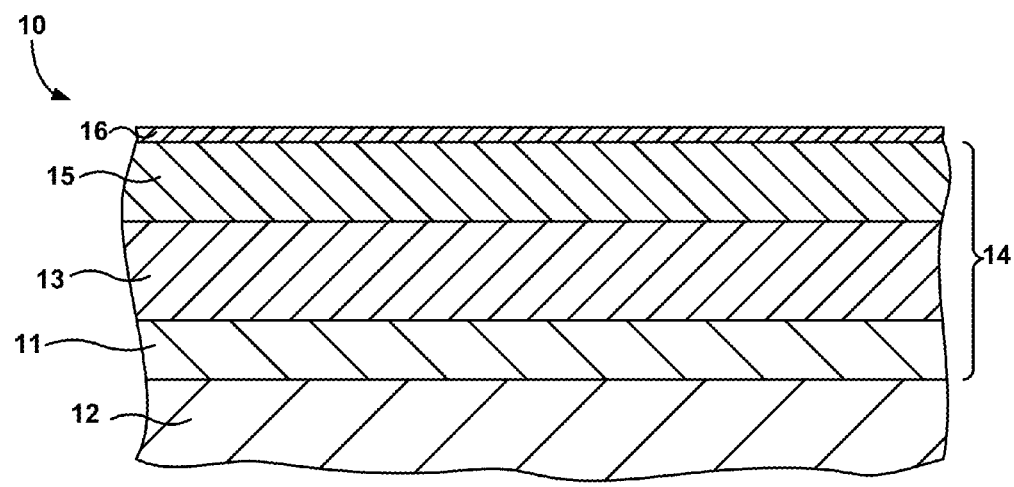

FIGS. 1A and 1B show cross-sectional views of an exemplary article 10 used in a high-temperature mechanical system. The article 10 includes a coating 14 applied to a substrate 12. The coating 14 includes a bond coat 11 applied to substrate 12, a thermal barrier coating (TBC) or environmental barrier coating (EBC) 13 applied to the bond coat 11, and a CMAS-resistant layer 15 applied to the TBC/EBC 13. The choice of including a TBC or an EBC may depend on the substrate, as will be described in more detail below.

The substrate 12 may be a component of a high temperature mechanical system, such as, for example, a gas turbine engine or the like. Typical superalloy substrates 12 include alloys based on Ni, Co, Ni/Fe, and the like. The superalloy substrate 12 may include other additive elements to alter its mechanical properties, such as toughness, hardness, temperature stability, corrosion resistance, oxidation resistance, and the like, as is well known in the art. Any useful superalloy substrate 12 may be utilized, including, for example, those available from Martin-Marietta Corp., Bethesda, Md., under the trade designation MAR-M247; those available from Cannon-Muskegon Corp., Muskegon, Mich., under the trade designations CMSX-4 and CMSX-10; and the like.

The substrate 12 may also include a ceramic matrix composite (CMC). The CMC may include any useful ceramic matrix material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave.

The filler composition, shape, size, and the like may be selected to provide the desired properties to the CMC. For example, in some embodiments, the filler material may be chosen to increase the toughness of a brittle ceramic matrix. In other embodiments, the filler may be chosen to provide a desired property to the CMC, such as thermal conductivity, electrical conductivity, thermal expansion, hardness, or the like.

In some embodiments, the filler composition may be the same as the ceramic matrix material. For example, a silicon carbide matrix may surround silicon carbide whiskers. In other embodiments, the filler material may include a different composition than the ceramic matrix, such as mullite fibers in an alumina matrix, or the like. One preferred CMC includes silicon carbide continuous fibers embedded in a silicon carbide matrix.

The article 10 may include a bond coat 11 adjacent to or overlying substrate 12. The bond coat 11 may improve adhesion between the TBC/EBC 13 and the substrate 12. The bond coat 11 may include any useful alloy, such as a conventional MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-Ni$_3$Al nickel aluminide alloy (either unmodified or modified by Pt, Cr, Hf, Zr, Y, Si, and combination thereof), or the like.

The bond coat 11 may also include ceramics or other materials that are compatible with a CMC substrate 12. For example, the bond coat 11 may include mullite, silicon, or the like. The bond coat 11 may further include other elements, such as silicates of rare earth elements including lutetium, ytterbium, erbium, dysprosium, gadolinium, europium, samarium, neodymium, cerium, lanthanum, scandium, yttrium, or the like. Some preferred bond coat 11 compositions for overlying a CMC substrate 12 include silicon, mullite, yttrium silicates and ytterbium silicates.

The bond coat 11 may be selected based on a number of considerations, including the chemical composition and phase constitution of the TBC/EBC 13 and the substrate 12. For example, when the substrate 12 includes a superalloy with γ-Ni+γ'-Ni$_3$Al phase constitution, the bond coat 11 preferably includes aγ-Ni+γ'-Ni$_3$Al phase constitution to better match the coefficient of thermal expansion of the superalloy substrate 12, and therefore increase the mechanical stability (adhesion) of the bond coat 11 to the substrate 12. Alternatively, when the substrate 12 includes a CMC, the bond coat 11 is preferably silicon or a ceramic, such as, for example, mullite.

In some embodiments, a bond coat 11 including a single layer may not fulfill all the functions desired of a bond coat 11. Thus, in some cases, the bond coat 11 may include multiple layers. For example, in some embodiments where the substrate 12 is a CMC comprising silicon carbide, a bond coat including a layer of silicon followed by a layer of mullite (aluminum silicate, Al$_6$Si$_2$O$_{13}$), a rare earth silicate, or a mullite/rare earth silicate dual layer is deposited on the CMC substrate 12. A bond coat 11 comprising multiple layers may be desirable on a CMC substrate 12 to accomplish the desired functions of the bond coat 11, such as, for example, adhesion of the substrate 12 to the TBC/EBC 13, chemical compatibility of the bond coat 11 with each of the substrate 12 and the TBC/EBC 13, a desirable CTE match between adjacent layers, and the like.

In yet other embodiments, the article 10 may not include a bond coat 11. For example, in some embodiments, the TBC/EBC 13 may be applied directly to the substrate 12. A bond coat 11 may not be required or desired when the TBC/EBC 13 and the substrate 12 are chemically and/or mechanically compatible. For example, in embodiments where the TBC/EBC 13 and substrate 12 adhere sufficiently strongly to each other, a bond coat 11 may not be necessary. Additionally, in embodiments where the coefficients of thermal expansion of the substrate 12 and TBC/EBC 13 are sufficiently similar, a bond coat 11 may not be necessary. In this way, TBC/EBC 13 may be either adjacent to or overlie bond coat 11 or be adjacent to or overlie substrate 12.

TBC/EBC 13 may be selected to provide a desired type of protection to substrate 12. For example, when a substrate 12 including a superalloy is utilized, a thermal barrier coating may be desired to provide temperature resistance to substrate 12. A TBC, then, may provide thermal insulation to substrate 12 to lower the temperature experienced by substrate 12. On the other hand, when a substrate 12 including a CMC is utilized, an EBC or an EBC/TBC bilayer or multilayer coating may be desired to provide resistance to oxidation, water vapor attack, or the like.

A TBC may include any useful insulative layer. Common TBCs include ceramic layers comprising zirconia or hafnia. The zirconia or hafnia TBC may include other elements or compounds to modify a desired characteristic of the TBC, such as, for example, phase stability, thermal conductivity, or the like. Exemplary additive elements or compounds include, for example, rare earth oxides. The TBC may be applied by any useful technique, including, for example, plasma spraying, electron beam physical vapor deposition, chemical vapor deposition, and the like.

An EBC may include any useful layer which prevents environmental attack of the substrate. For example, the EBC may include materials that are resistant to oxidation or water vapor attack. Exemplary EBCs include mullite; glass ceramics such as barium strontium aluminosilicate (BaO—SrO—$Al_2O_3$-$2SiO_2$), calcium aluminosilicate ($CaAl_2Si_2O_8$), cordierite (magnesium aluminosilicate), and lithium aluminosilicate; and rare earth silicates. The EBC may be applied by any useful technique, such as plasma spraying, electron beam physical vapor deposition, chemical vapor deposition and the like.

Regardless of whether coating 14 includes an EBC or a TBC, a CMAS-resistant layer 15 may be provided adjacent to or overlying TBC/EBC 13 to protect the TBC/EBC 13 from infiltration of CMAS into the pores of the TBC/EBC 13. The CMAS-resistant layer 15 may react with any CMAS present on the coating 14 and form a reaction layer 16, as shown in FIG. 1B. The CMAS-resistant layer 15 and reaction layer 16 may form a barrier to reduce or prevent the infiltration of CMAS into the pores of the porous TBC/EBC 13.

In some embodiments, the CMAS-resistant layer 15 may be a distinct layer, separate from TBC/EBC 13, as shown in FIGS. 1A and 1B. The CMAS-resistant layer 15 may be applied to the TBC/EBC 13 using any useful method including, for example, plasma spraying, electron beam vapor deposition, chemical vapor deposition and the like.

The CMAS-resistant layer 15 may include any element that reacts with CMAS to form a solid or a highly-viscous reaction product (i.e., a reaction product that is a solid or highly viscous at the temperatures experienced by the article 10). The reaction product may have a melting temperature significantly higher than CMAS (e.g., higher than about 1200-1250° C.). A solid or highly viscous reaction product is desired because the CMAS-resistant layer 15 is consumed as it reacts with CMAS to form reaction layer 16. If, for example, the reaction product of CMAS-resistant layer 15 and CMAS was a relatively low viscosity liquid, the low viscosity liquid would infiltrate the porous EBC/TBC 13 once the CMAS-resistant layer 15 is consumed by the reaction, which is the very occurrence the CMAS-resistant layer 15 is designed to prevent.

If the reaction product is a solid or highly viscous, however, a reaction layer 16 will form on the surface of CMAS-resistant layer 15, which will lower the reaction rate of the CMAS with the CMAS-resistant layer 15. That is, once a solid or highly viscous reaction layer 16 forms on the surface of the CMAS-resistant layer 15, the reaction between the CMAS-resistant layer 15 and CMAS will slow, because any further reaction will require the diffusion of CMAS through the reaction layer 16 to encounter the CMAS-resistant layer 15, or diffusion of a component of the CMAS-resistant layer 15 through the reaction layer 16 to encounter the CMAS. In either case, the diffusion of either CMAS or the component of the CMAS-resistant layer 15 is expected to be the limiting step in the reaction once a solid reaction layer 16 is formed on the surface of CMAS-resistant layer 15, because diffusion will be the slowest process.

The CMAS-resistant layer 15 includes at least one rare earth oxide. Useful rare earth oxides include oxides of rare earth elements, including, for example, Sc, Y, La, Ce, Pr, Nd, Pm, Sm, Eu, Gd, Tb, Dy, Ho, Er, Tm, Yb, Lu, and combinations thereof. In some embodiments, the CMAS-resistant layer 15 is essentially free of zirconia and hafnia. That is, in these embodiments, the coating includes at most trace amounts of zirconia and hafnia, such as, for example, the amounts present in commercially-available rare earth oxides.

The CMAS-resistant layer 15 may also include alumina and/or silica in addition to the at least one rare earth oxide. For example, the CMAS-resistant layer 15 may include alumina and at least one rare earth oxide, silica and at least one rare earth oxide, or alumina, silica, and at least one rare earth oxide. Alumina and/or silica may be added to the CMAS-resistant layer 15 to tailor one or more properties of the CMAS-resistant layer 15, such as, for example, the chemical reactivity of the layer 15 with CMAS, the viscosity of the reaction products, the coefficient of thermal expansion, the chemical compatibility of the layer 15 with the EBC/TBC 13, and the like.

Further, in some embodiments, the CMAS-resistant layer 15 may optionally include other additive components, such as, for example, $Ta_2O_5$, $HfSiO_4$, alkali oxides, alkaline earth oxides, or mixtures thereof. The additive components may be added to the CMAS-resistant layer 15 to modify one or more desired properties of the layer 15. For example, the additive components may increase or decrease the reaction rate of the CMAS-resistant layer 15 with CMAS, may modify the viscosity of the reaction product from the reaction of CMAS and the CMAS-resistant layer 15, may increase adhesion of the CMAS-resistant layer 15 to the TBC/EBC 13, may increase or decrease the chemical stability of the CMAS resistant layer 15, or the like.

The CMAS-resistant layer 15 may include from about 1 mol. % to about 100 mol. % of the at least one rare earth oxide, ±1 mol. %. In some embodiments, the CMAS-resistant layer 15 may also include up to about 99 mol. % of at least one of alumina, silica and combinations thereof, ±1 mol. %, with a total of 100 mol. %.

In some preferred embodiments, the CMAS-resistant layer 15 may include about 10 mol. % to about 90 mol. % of at least one rare earth oxide, and about 10 mol. % to about 90 mol. % of at least one of alumina, silica, and combinations thereof and, optionally, about 0.1 mol. % to about 50 mol. % of the additive components. In other preferred embodiments, the CMAS-resistant layer 15 may include about 20 mol. % to about 80 mol. % of at least one rare earth oxide and about 20 mol. % to about 80 mol. % of at least one of alumina, silica, and combinations thereof and, optionally, about 1 mol. % to about 30 mol. % of the additive components.

The thickness of the CMAS-resistant layer 15 may vary widely depending on the conditions under which article 10 is to be used. For example, if CMAS deposits are expected to be extensive, CMAS-resistant layer 15 may be thicker. Additionally, if CMAS-resistant layer 15 is to replace TBC/EBC 13, as will be described in further detail below, the thickness of CMAS-resistant layer 15 may be determined by the thermal conditions to which article 10 is exposed. The thickness depending on the intended application may range from about 0.1 mils (1 mil=0.001 inch) to about 60 mils, ±0.1 mil. In some embodiments, the thickness of CMAS-resistant layer 15 may range from about 0.1 mils to about 30 mils. In other embodiments, the thickness of CMAS-resistant layer 15 may range from about 0.5 mils to about 15 mils.

It may also be preferred that the coefficient of thermal expansion of the CMAS-resistant layer is similar to the coefficient of thermal expansion of the TBC/EBC 13. Thus, the coefficient of thermal expansion of the component or components comprising the CMAS-resistant layer 15 may be an important consideration when designing the CMAS-resistant layer 15. Table 1 shows some exemplary rare earth silicates (e.g., a rare earth oxide mixed with silica ($SiO_2$)) and their corresponding coefficients of thermal expansion.

TABLE 1

Coefficients of Thermal Expansion for Various Rare Earth Oxides

| | Rare Earth Silicate | | | | | |
|---|---|---|---|---|---|---|
| | $Nd_2SiO_5$ | $Gd_2SiO_5$ | $Dy_2SiO_5$ | $Yb_2SiO_5$ | $Lu_2SiO_5$ | $Yb_2Si_2O_7$ |
| CTE ($10^{-6}$/° C.) | 9.9 | 10.1 | 8.5 | 8 | 7.9 | 5.2 |

The exemplary rare earth silicates have coefficients of thermal expansion that differ by as much as a factor of two (e.g., $Gd_2SiO_5$ ($Gd_2O_3+SiO_2$) and $Yb_2Si_2O_7$ ($Yb_2O_3+2SiO_2$)). This permits a fairly wide range of tailoring of the coefficient of thermal expansion of CMAS-resistant layer 15 to be similar to the TBC/EBC 13. For example, a TBC including yttria-stabilized zirconia has a coefficient of thermal expansion of about $10 \times 10^{-6}$/° C. Thus, either neodymium silicate ($Nd_2SiO_5$)-based or gadolinium silicate ($Gd_2SiO_5$)-based compositions may be particularly desirable for including in a CMAS-resistant layer 15, along with any desired additive components. As a second example, a CMC substrate may have a coefficient of thermal expansion of about $4 \times 10^{-6}$/° C. to about $5 \times 10^{-6}$/° C. In embodiments where the CMAS-resistant layer 15 is applied directly to a CMC substrate 12 or to a bond coat 11 attached to a CMC substrate 12 (as will be described in further detail below), ytterbium silicate ($Yb_2Si_2O_7$)-based compositions may be a desirable choice to include in the CMAS-resistant layer 15, along with any other desired additive components.

Figure 2:
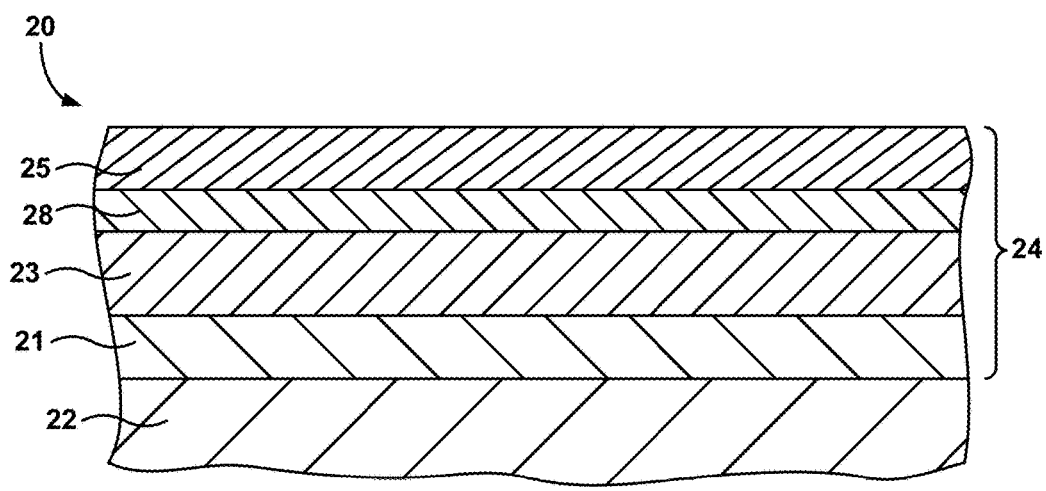
FIG. 2 is a cross-sectional diagram of an alternative embodiment of a substrate coated with a bond coat and a thermal or environmental barrier coating including a transition layer and a CMAS-resistant layer.

Other coating geometries may also be used to reduce the stress placed on the interface of CMAS-resistant layer 15 and TBC/EBC 13 during thermal cycles due to different coefficients of thermal expansion. For example, as shown in FIG. 2, another article 20 may include a substrate 22 and a coating 24. The coating 24 may include a bond coat 21, a TBC/EBC 23, and a CMAS-resistant layer 25, as in FIG. 1. However, unlike the embodiment shown in FIG. 1, the coating 24 shown in FIG. 2 further includes a transitional layer 28 between the CMAS-resistant layer 25 and the TBC/EBC 23. The transitional layer 28 may include components of both the CMAS-resistant layer 25 and the TBC/EBC 23. For example, when a TBC/EBC 23 includes a TBC comprising zirconia and the CMAS-resistant layer 25 includes ytterbium silicate, the transitional layer 28 may include a mixture of zirconia and ytterbium silicate. The mixture may include an approximately equal amount of the components of the CMAS-resistant layer 25 and TBC/EBC 23, or may include any other desired mixture or proportion of components from the CMAS-resistant layer 25 and TBC/EBC 23.

The transitional layer 28 may be applied as a separate layer from the CMAS-resistant layer 25 and the TBC/EBC 23. For example, the TBC/EBC 23 may be applied first by plasma spraying. The desired mixture of TBC/EBC 23 components and CMAS-resistant layer 25 components may then be mixed and applied to the TBC/EBC 23 by plasma spraying, followed by application of pure CMAS-resistant layer 25 on the transitional layer 28.

Figure 3:
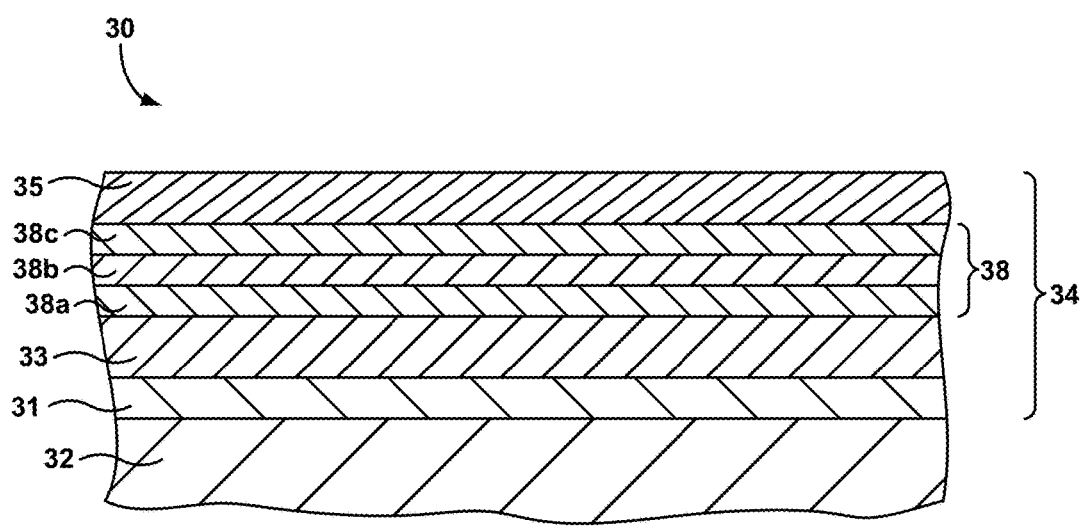
FIG. 3 is a cross-sectional diagram of a substrate coated with a bond coat and a thermal or environmental barrier coating including a transition layer and a CMAS-resistant layer.

Additionally, as shown in FIG. 3, the transitional layer 38 may also include more than one sub-layer. In this embodiment, the transitional layer 38 includes three sub-layers 38a, 38b, 38c. However, the transitional layer (e.g., transitional layer 38) may include as many or as few sub-layers as is desired. For example, transitional layer 38 may include one layer, up to three layers, three layers, or more than three layers.

Sub-layer 38a is preferably compositionally most similar to TBC/EBC 33, e.g., sub-layer 38a may include more than 50% (by weight, volume, moles, or the like) of components that form TBC/EBC 33. For example, sub-layer 38a may include about 90% (by weight, volume, moles, or the like) TBC/EBC 33 components, and about 10% (by weight, volume, moles, or the like) CMAS-resistant layer 35 components. Sub-layer 38b, then, may include an approximately equal amount of components from TBC/EBC 33 and CMAS-resistant layer 35, or approximately 50% (by weight, volume, moles, or the like) TBC/EBC 33 components, and about 50% (by weight, volume, moles, or the like) CMAS-resistant layer 35 components. Finally, sub-layer 38c may be more compositionally similar to the CMAS-resistant layer. For example, sub-layer 38c may include more than 50% (by weight, volume, moles, or the like) of CMAS-resistant layer 35 components. In one embodiment, sub-layer 38c may include about 90% (by weight, volume, moles, or the like) CMAS-resistant layer 35 components and about 10% (by weight, volume, moles, or the like) TBC/EBC 33 components.

Figure 4A:
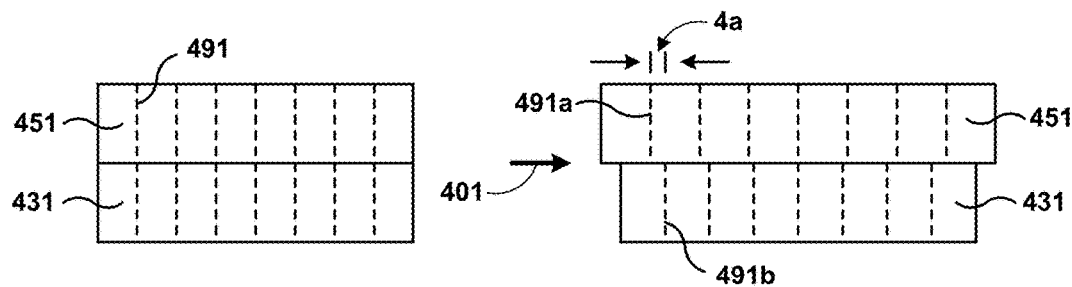
FIGS. 4A, 4B, and 4C are cross-sectional diagrams illustrating transitional layers between a thermal barrier coating and a CMAS-resistant layer.
Figure 4B:
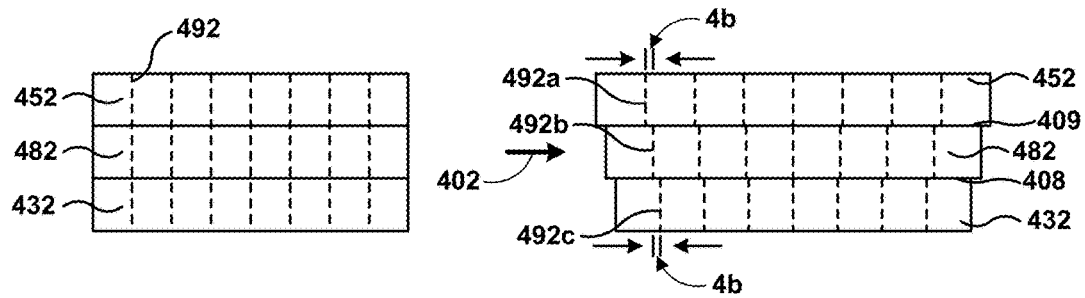
Figure 4C:
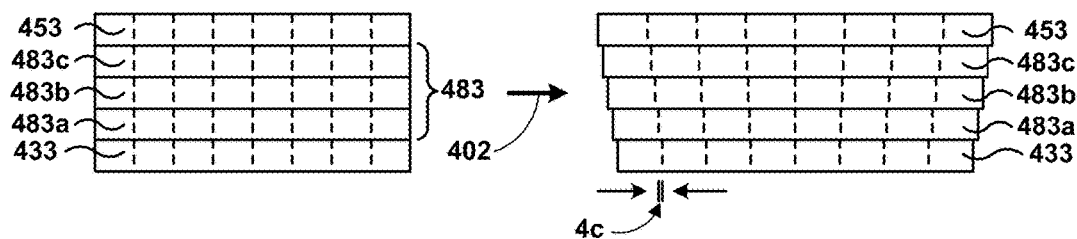

The inclusion of the transitional layer 28, 38 may reduce the coefficient of thermal expansion gradient, or in other words, make the compositional transition from the TBC/EBC 23, 33 to the CMAS-resistant layer 25, 35 more gradual, thus making the change of coefficients of thermal expansion more gradual. FIGS. 4A, 4B, and 4C illustrate simple examples of the reduced forces exerted on the interface of adjacent layers as the number of transitional layers is increased. In the following examples, it is assumed that the CMAS-resistant layers have a greater coefficient of thermal expansion than the TBC/EBC layers. While in practice this may or may not be true, it is convenient for the sake of these simple examples. Additionally, expansion is shown as occurring in only the horizontal direction of FIGS. 4A-C, which may or may not be true in real systems. In real systems, the expansion may occur equally in all directions, may occur in a greater amount in one or more direction than in another direction, or may occur in inconsistent amounts throughout the material, depending on the temperature profile in the material and the isotropy or anisotropy of the material, for example.

As one example, FIG. 4A shows a CMAS-resistant layer 451 located immediately adjacent TBC/EBC 431. Upon heating (indicated by arrow 401), the CMAS-resistant layer 451 expands laterally further than TBC/EBC 431 expands. Line 491 in FIG. 4A indicates a vertical slice of the TBC/EBC 431 and CMAS-resistant layer 451. As the thermal expansion progresses, line 491 symbolically breaks into two sections 491a and 491b corresponding to CMAS-resistant layer 451 and TBC/EBC 431, respectively. Additionally, this expansion is indicated by gap 4a, the distance between line sections 491a and 491b. The difference in rates or extent of expansion, then, causes a stress at the interface of TBC/EBC 431 and CMAS-resistant layer 451.

FIG. 4B, then, includes a transitional layer 482 between the CMAS-resistant layer 452 and TBC/EBC 432. As the article is heated (indicated by arrow 402), the transitional layer 492 expands an intermediate amount, more than the TBC/EBC 432 but less than CMAS-resistant layer 452. This reduces the strain exerted on interface 408 between the TBC/EBC 432 and the transitional layer 482 and on interface 409 between the transitional layer 482 and CMAS-resistant layer 452. As indicated by gap 4b, the difference in expansion of the transitional layer 482 and the CMAS-resistant layer 452, also shown as the distance between line 492a and line 492b, is lower in FIG. 4B than in 4A, while the expansion of the CMAS-resistant layers 452 and 451 and TBC/EBCs 431 and 432, respectively, are the same.

As a final example, FIG. 4C shows a transitional layer 483 that is compositionally graded. That is, each of sub-layers 483a, 483b, 483c is a different composition, with sub-layer 483a being compositionally most similar to TBC/EBC 133, sub-layer 483c being compositionally most similar to CMAS-resistant layer 453, and sub-layer 483b being compositionally intermediate. This construction further reduces the strain on the article due to thermal expansion caused by heat (represented by arrow 402). The difference in thermal expansion between each adjacent layer, which is represented by gap 4c, is smaller than either of gaps 4a or 4b, which indicated lower thermal expansion differences, and thus lower stresses on the interfaces between the layers.

It may be understood that the more sub-layers included in the transitional layer, the lower the interfacial stresses due to mismatches of coefficients of thermal expansion. The number of sub-layers in the transitional layer need not be limited, but may be chosen according to the desired properties of the article and the time and expense involved in producing the article.

The article may also include a transition layer that is not divided into sub-layers, but which includes a continuously graded composition. For example, the transition layer may be compositionally most similar to the TBC/EBC at the TBC/EBC-transitional layer interface, and most similar to the CMAS-resistant layer at the CMAS-resistant layer-transitional layer interface, with a composition that continuously transitions from the TBC/EBC composition to the CMAS-resistant layer composition along the depth of the transitional layer.

Figure 5:
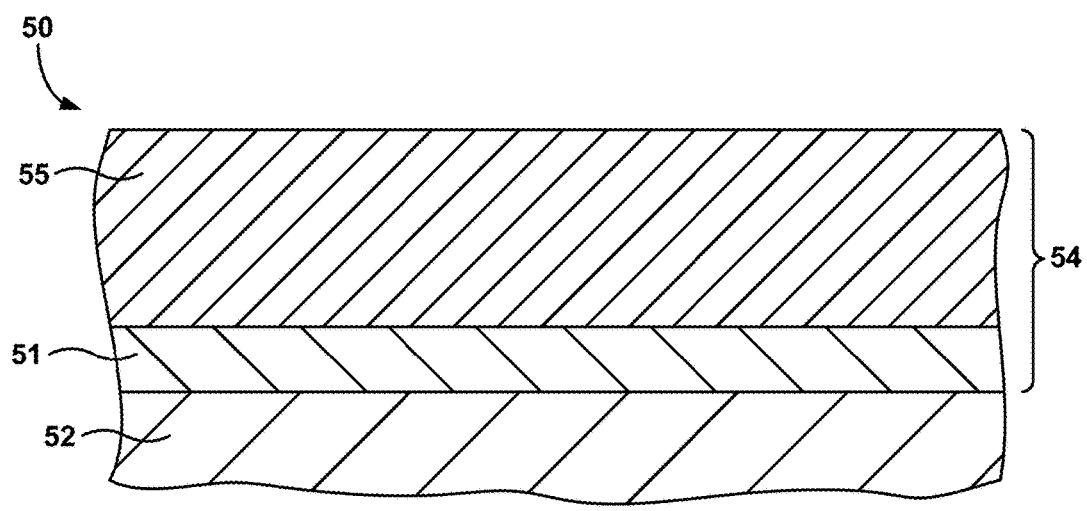
FIG. 5 is a cross-sectional diagram of a substrate coated with a bond coat and a CMAS-resistant layer.

As shown in FIG. 5, the CMAS-resistant layer 55 may also replace the TBC or EBC in some embodiments. Replacing the TBC or EBC with a CMAS-resistant layer 55 may allow better matching of the properties of the substrate 52 and the CMAS-resistant layer 55 than substrate 52 and a TBC or EBC (e.g., the coefficient of thermal expansion). The CMAS-resistant layer 55 may provide one or more of the above-described benefits, including, for example, CMAS resistance, coefficient of thermal expansion matching, and the like, while still providing low thermal conductivity similar to or better than conventional TBCs.

The article 50 may include a CMAS-resistant layer 55 applied to a bond coat 51, as shown in FIG. 5, or the CMAS-resistant layer 55 may be applied directly to the substrate 52. The CMAS-resistant layer may again include at least one rare earth oxide. Useful rare earth oxides include oxides of rare earth elements, including, for example, Sc, Y, La, Ce, Pr, Nd, Pm, Sm, Eu, Gd, Tb, Dy, Ho, Er, Tm, Yb, Lu, and combinations thereof. In some embodiments, the CMAS-resistant layer 55 may be essentially free of zirconia and hafnia. That is, in these embodiments, the coating includes at most trace amounts of zirconia and hafnia, such as, for example, the amounts present in commercially-available rare earth oxides.

When CMAS-resistant layer 55 replaces the TBC or EBC, the CMAS-resistant layer 55 may also include alumina, silica, or a mixture of alumina and silica.

In some embodiments, the CMAS-resistant layer 55 may optionally include up to about 50 mol. % additive components, such as, for example, $Ta_2O_5$, $HfSiO_4$, alkali oxides, alkaline earth oxide, or mixtures thereof. The additive components may be added to the CMAS-resistant layer 55 to modify one or more desired properties. For example, the additive components may increase or decrease the reaction rate of the CMAS-resistant layer 55 With CMAS, may modify the viscosity of the reaction product from the reaction of CMAS and the CMAS-resistant layer 55, may increase adhesion of the CMAS-resistant layer 55 to the bond coat 51 or substrate 52, may increase or decrease the chemical stability of the CMAS resistant layer 55, or the like.

In some preferred embodiments, the CMAS-resistant layer 55 may include about 10 mol. % to about 90 mol. % of at least one rare earth oxide and about 10 mol. % to about 90 mol. % of at least one of alumina, silica, and combinations thereof, and optionally, about 0.1 mol. % to about 50 mol. % of the additive components. In other preferred embodiments, the CMAS-resistant layer 15 may include about 20 mol. % to about 80 mol. % of at least one rare earth oxide and about 20 mol. % to about 80 mol. % of at least one of alumina, silica, and combinations thereof, and optionally, about 1 mol. % to about 30 mol. % of the additive components. All measurements are ±1 mol. %

The CMAS-resistant layer may be applied to the bond coat 51 or substrate 52 using any useful technique, including, for example, electron beam physical vapor deposition, plasma spraying, chemical vapor deposition, and the like.

EXAMPLES

Example 1

Figure 6A:
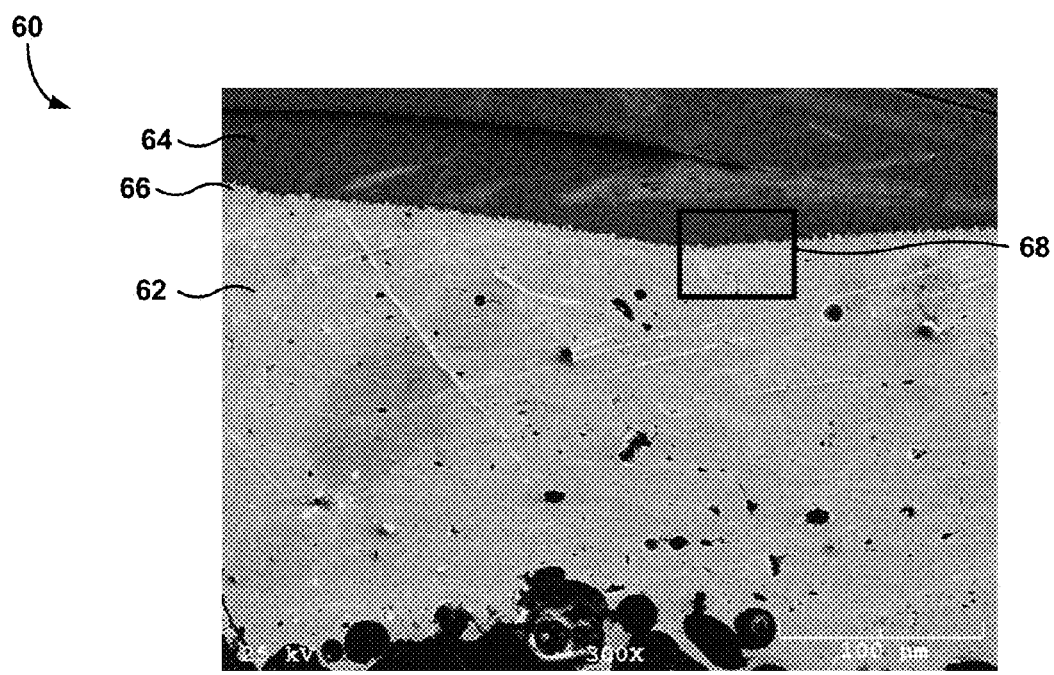
FIGS. 6A and 6B are cross-sectional photographs of an ytterbium silicate (Yb$_2$Si$_2$O$_7$) layer in contact with a CMAS layer and a reaction layer formed at the interface.
Figure 6B:
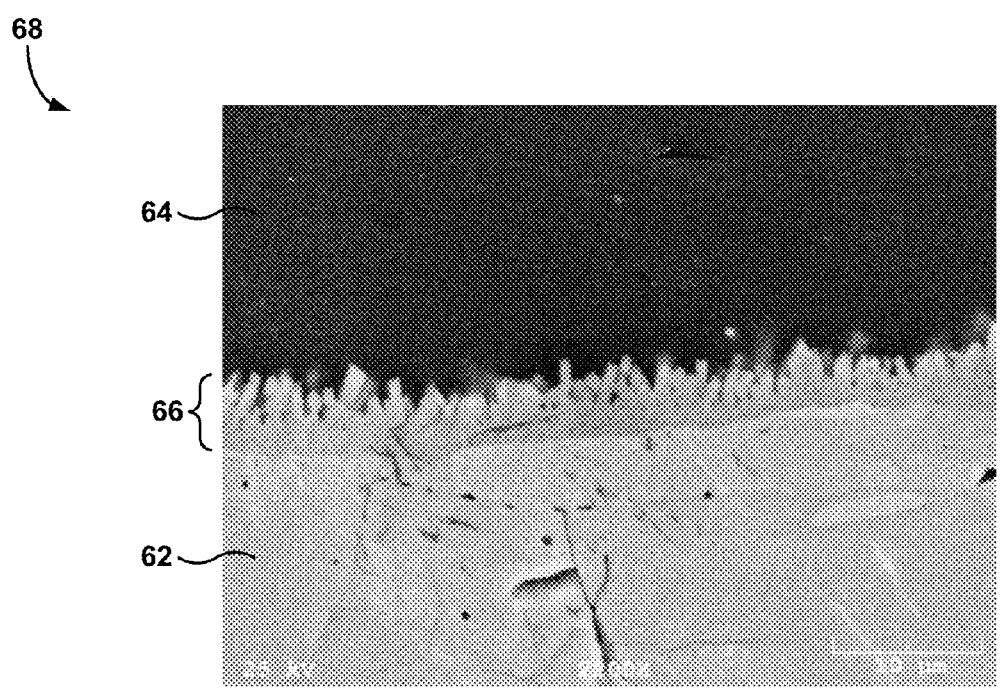

FIGS. 6A and 6B show two cross-sectional photographs of an article 60 including an ytterbium silicate ($Yb_2Si_2O_7$ or $Yb_2O_3$-$2SiO_2$) layer 62 adjacent a CMAS layer 64. The article 60 has been exposed to a temperature of 1250° C. for 4 hours prior to the photograph. The CMAS and ytterbia silicate have reacted at the interface to form a thin (about 5

μm thick) reaction layer 66. A portion 68 of the article 60, which shows the reaction layer 66 more clearly, is shown in FIG. 6B.

Example 2

Figure 7A:
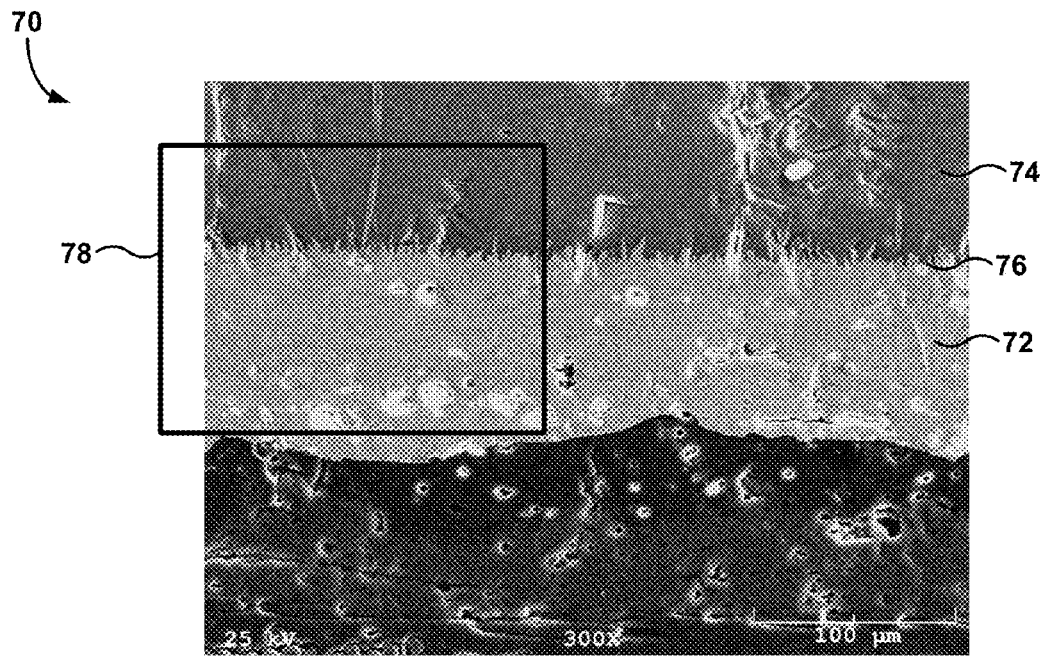
FIGS. 7A and 7B are cross-sectional photographs of an ytterbium silicate (Yb$_2$Si$_2$O$_7$) layer in contact with a CMAS layer and a reaction layer formed at the interface.
Figure 7B:
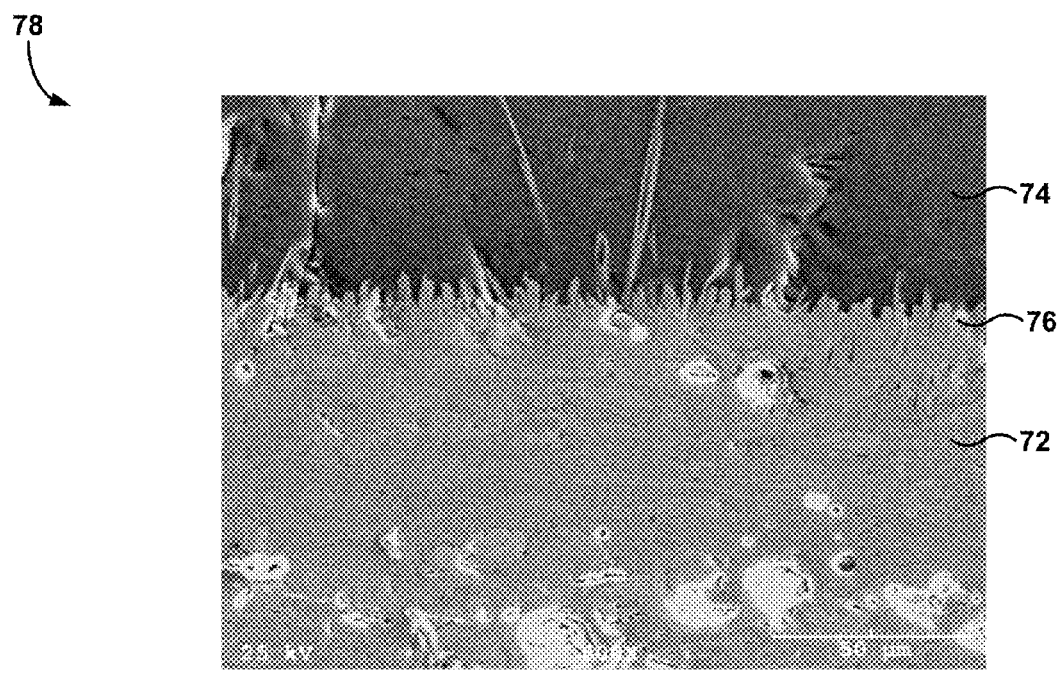

FIGS. 7A and 7B show two cross-sectional photographs of an article 70 including an ytterbium silicate ($Yb_2Si_2O_7$ or $Yb_2O_3$-$2SiO_2$) layer 72 adjacent a CMAS layer 74. The article 70 has been exposed to a temperature of 1350° C. for 4 hours prior to the photograph. The CMAS and ytterbium silicate have reacted at the interface to form a reaction layer 76. A portion 78 of the article 70 is shown in FIG. 7B.

Example 3

Figure 8A:
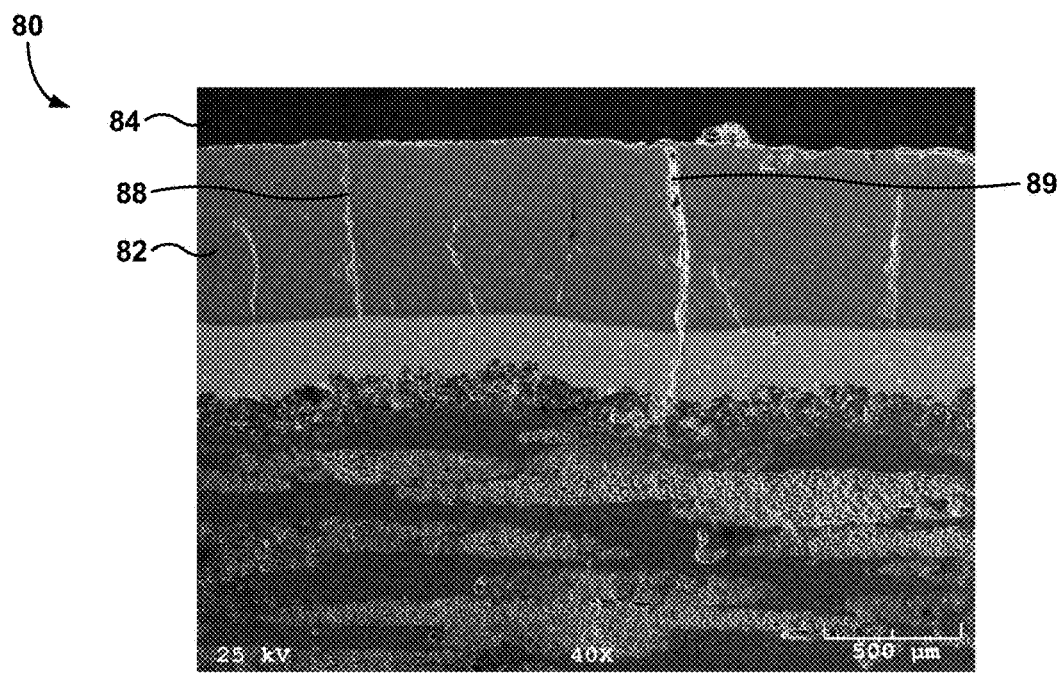
FIGS. 8A and 8B are cross-sectional photographs of an ytterbium silicate (Yb$_2$SiO$_5$) layer in contact with a CMAS layer and a reaction layer formed at the interface.
Figure 8B:
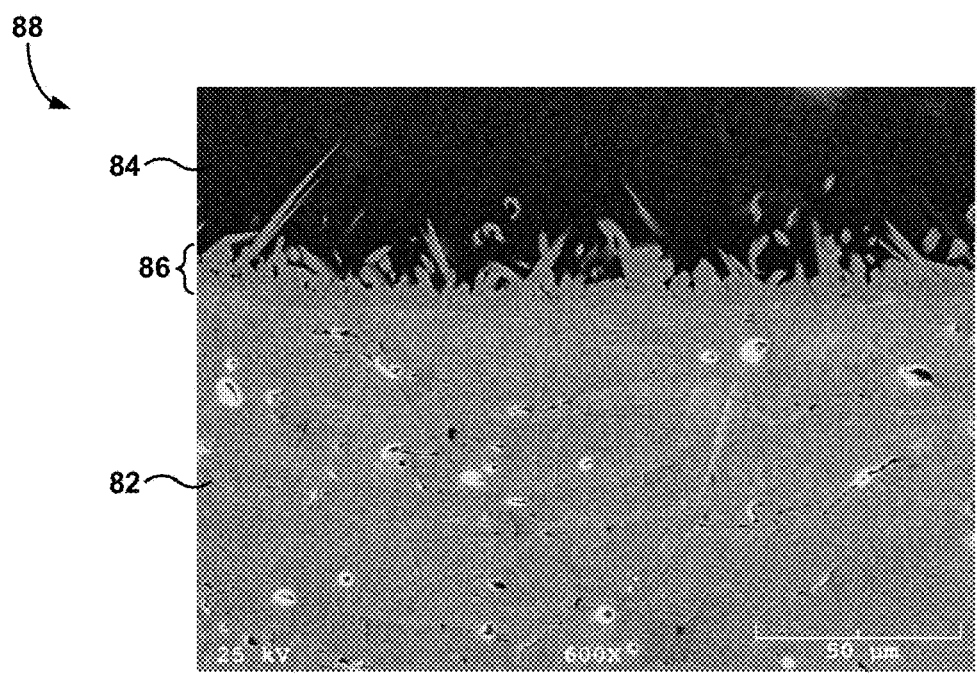

FIGS. 8A and 8B show two cross-sectional photographs of an article 80 after exposure to a temperature of 1350° C. for 4 hours. The article includes a layer 82 of a second type of ytterbium silicate ($Yb_2SiO_5$ or $Yb_2O_3$—$SiO_2$) adjacent a CMAS layer 84. The CMAS and ytterbia silicate have again reacted at the interface and formed a reaction layer 86 that is about 10 μm thick. Additionally, FIG. 8A shows cracks 88, 89 in the ytterbium silicate layer 82. CMAS has not infiltrated the cracks 88, 89, which indicate that the reaction layer 86 quickly formed an effective barrier to molten CMAS. A portion 88 of the article 80, which shows the reaction layer 86 more clearly, is shown in FIG. 8B.

Example 4

Figure 9:
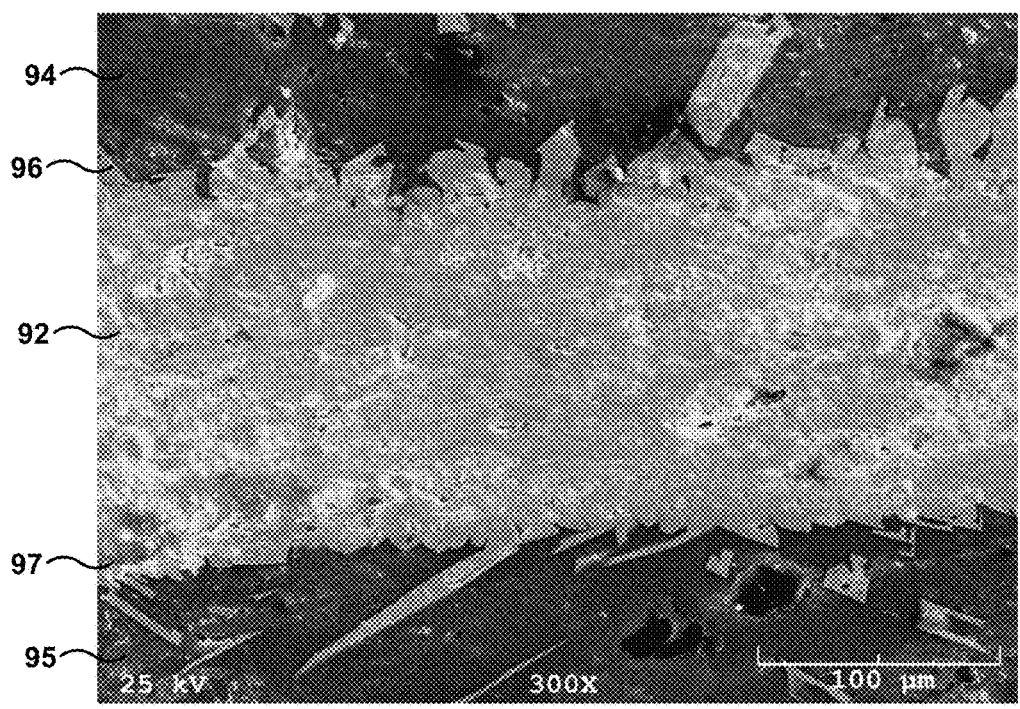
FIG. 9 is a cross-sectional photograph of an ytterbium silicate (Yb$_2$SiO$_5$) layer in contact with two CMAS layers and reaction layers formed at the interfaces of the ytterbium silicate layer and the CMAS layers.

FIG. 9 shows an ytterbium silicate ($Yb_2SiO_5$ or $Yb_2O_3$—$SiO_2$) layer 92 contacting CMAS layers 94, 95 on both surfaces of the layer 92 after exposure to a temperature of 1450° C. for 4 hours. Reaction layers 96, 97 have formed on both surfaces of the ytterbium silicate layer 92.

Example 5

Figure 10:
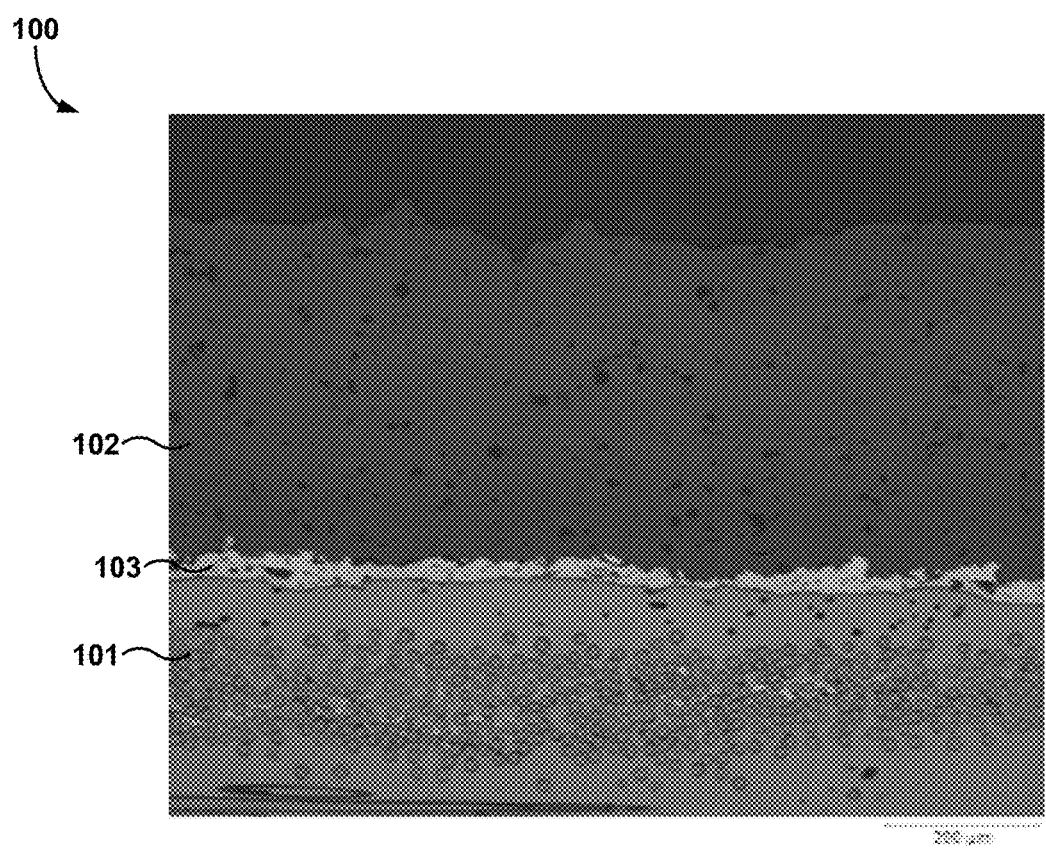
FIG. 10 is a cross-sectional photograph of an ytterbium silicate (Yb$_2$Si$_2$O$_7$) layer bonded to a CMC substrate by a Si bond coat layer.

FIG. 10 shows an article 100 including a CMC substrate 101, a silicon bond coat 103 applied to substrate 101, and an ytterbium silicate ($Yb_2Si_2O_7$ or $Yb_2O_3$-$2SiO_2$) layer 102 applied to the bond coat 103. The article was exposed to one hundred 1 hour thermal cycles at 1300° C. (2372° F.) and 90% water vapor in oxygen, which mimics the conditions of a combustion section of a gas turbine engine. After the thermal cycling, the ytterbium silicate layer remains well-adhered to the CMC substrate 101, and the substrate 101 shows no evidence of damage.

Various embodiments of the invention have been described. These and other embodiments are within the scope of the following claims.

What is claimed is:

1. An article comprising:
    a substrate comprising at least one of a superalloy, a ceramic, or a ceramic matrix composite;
    at least one layer formed over the substrate, wherein the at least one layer comprises a thermal barrier coating layer, and wherein the thermal barrier coating layer comprises at least one of rare earth oxide-stabilized zirconia or rare earth oxide-stabilized hafnia; and
    a CMAS-resistant layer formed over the at least one layer, wherein the CMAS-resistant layer comprises free rare earth oxide, free silica, and an alkali oxide and is essentially free of zirconia and hafnia, wherein the CMAS-resistant layer is the outermost layer, and wherein the CMAS-resistant layer comprises at least 10 mol. % free rare earth oxide.

2. The article of claim 1, wherein the CMAS-resistant layer further comprises alumina.

3. The article of claim 2, wherein the CMAS-resistant layer comprises up to 90 mol. % alumina and the free silica, between 0.1 mol. % and 50 mol. % of the alkali oxide, and a balance of the free rare earth oxide, with a total of 100 mol. %.

4. The article of claim 2, wherein the CMAS-resistant layer comprises 10 mol. % to 90 mol. % of the free rare earth oxide, 10 mol. % to 90 mol. % of alumina and the free silica, and between 0.1 mol. % and 50 mol. % of the alkali oxide, with a total of 100 mol. %.

5. The article of claim 2, wherein the CMAS-resistant layer comprises 20 mol. % to 80 mol. % of the free rare earth oxide, between 0.1 mol. % and 50 mol. % of the alkali oxide, and 20 mol. % to 80 mol. % of alumina and the free silica, with a total of 100 mol. %.

6. The article of claim 2, wherein the CMAS-resistant layer comprises between about 10 mol. % and about 90 mol. % of the free rare earth oxide, between about 10 mol. % and about 90 mol. % of a combination of alumina and the free silica, and between about 0.1 mol. % and about 50 mol. % of a mixture of the alkali oxide and an additive component selected from the group consisting of $Ta_2O_5$, alkaline earth oxides, and combinations thereof.

7. The article of claim 1, wherein the free rare earth oxide is selected from the group consisting of oxides of scandium, yttrium, lanthanum, cerium, praseodymium, neodymium, promethium, samarium, europium, gadolinium, terbium, dysprosium, holmium, erbium, thulium, ytterbium, lutetium, and combinations thereof.

8. The article of claim 1, wherein the CMAS-resistant layer is about 0.1 mil to about 60 mil thick.

9. The article of claim 1, wherein the at least one layer formed over the substrate further comprises an environmental barrier coating layer, wherein the environmental barrier coating layer comprises at least one of mullite, barium strontium aluminosilicate, calcium aluminosilicate, cordierite, lithium aluminosilicate, or a rare earth silicate.

10. The article of claim 1, further comprising a bond coat layer disposed between the substrate and the at least one layer, wherein the bond coat layer comprises at least one of a MCrAlY alloy, wherein M is selected from Ni, Co, and NiCo; a β-NiAl alloy; or a γ-Ni +γ'-$Ni_3Al$ alloy.

11. The article of claim 10, wherein the bond coat layer comprises the β-NiAl alloy, and wherein the β-NiAl alloy further comprises at least one of Pt, Cr, Hf, Zr, Y, Si, and combinations thereof.

12. The article of claim 10, wherein the bond coat layer comprises the γ-Ni+γ'-$Ni_3Al$ alloy, and wherein the γ-Ni+γ'-$Ni_3Al$ alloy further comprises at least one of Pt, Cr, Hf, Zr, Y, Si, and combinations thereof.

13. The article of claim 1, further comprising a transitional layer, wherein the transitional layer is between the at least one layer and the CMAS-resistant layer.

14. A method comprising:
    forming at least one layer over substrate comprising at least one of a superalloy, a ceramic, or a ceramic matrix composite, wherein the at least one layer comprises a thermal barrier coating layer, and wherein the thermal barrier coating layer comprises at least one of rare earth oxide-stabilized zirconia or rare earth oxide-stabilized hafnia; and
    forming a CMAS-resistant layer over the at least one layer, wherein the CMAS-resistant layer comprises free rare earth oxide, free silica, and an alkali oxide and is essentially free of zirconia and hafnia, wherein the CMAS-resistant layer is the outermost layer, and wherein the CMAS-resistant layer comprises at least 10 mol. % of the free rare earth oxide.

15. The method of claim 14, wherein the CMAS-resistant layer further comprises alumina.

16. The method of claim 15, wherein the CMAS-resistant layer comprises between about 10 mol. % and about 90 mol. % of the free rare earth oxide, between about 10 mol. % and about 90 mol. % of a combination of alumina and the free silica, and between about 0.1 mol. % and about 50 mol. % of a mixture of the alkali oxide and an additive component selected from the group consisting of $Ta_2O_5$, alkaline earth oxides, and combinations thereof.

17. The method of claim 14, wherein the CMAS-resistant layer is adjacent the thermal barrier coating layer.

18. The method of claim 14, wherein the at least one layer formed over the substrate further comprises an environmental barrier coating layer, wherein the environmental barrier coating layer comprises at least one of mullite, barium strontium aluminosilicate, calcium aluminosilicate, cordierite, lithium aluminosilicate, or a rare earth silicate.

19. The method of claim 14, further comprising a bond coat layer disposed between the substrate and the at least one layer, wherein the bond coat layer comprises at least one of a MCrAlY alloy, wherein M is selected from Ni, Co, and NiCo; a β-NiAl alloy; or a γ-Ni+γ'-$Ni_3Al$ alloy.

* * * * *

UNITED STATES PATENT AND TRADEMARK OFFICE
CERTIFICATE OF CORRECTION

PATENT NO. : 10,233,760 B2
APPLICATION NO. : 14/033043
DATED : March 19, 2019
INVENTOR(S) : Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Nineteenth Day of May, 2020

Andrei Iancu
*Director of the United States Patent and Trademark Office*